(12) United States Patent
Mizuno

(10) Patent No.: US 8,348,771 B2
(45) Date of Patent: Jan. 8, 2013

(54) CROSS SHAFT MEMBER AND CROSS SHAFT JOINT WITH THE SAME

(75) Inventor: Koichiro Mizuno, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 355 days.

(21) Appl. No.: 12/155,911

(22) Filed: Jun. 11, 2008

(65) Prior Publication Data

US 2008/0311999 A1  Dec. 18, 2008

(30) Foreign Application Priority Data

Jun. 13, 2007  (JP) ................. P2007-155929

(51) Int. Cl.
 *F16D 3/38* (2006.01)
(52) U.S. Cl. .............. 464/11; 464/136; D99/23
(58) Field of Classification Search ............. 464/11, 464/14, 136, 12, 13; D99/23, 25, 27
See application file for complete search history.

(56) References Cited

U.S. PATENT DOCUMENTS

| 1,324,480 | A | * | 12/1919 | Thiemer | 464/14 |
| 2,170,315 | A | * | 8/1939 | Wonderly | 464/136 X |
| 2,844,949 | A | * | 7/1958 | Stillwagon, Jr. | 464/136 |

FOREIGN PATENT DOCUMENTS

| JP | 4-31326 | 3/1992 |
| JP | 2002-47552 | 2/2002 |
| JP | 2002-310181 | 10/2002 |
| JP | 2005-351401 | 12/2005 |
| JP | 2006-264399 | 10/2006 |
| JP | 2007-85474 | 4/2007 |

* cited by examiner

*Primary Examiner* — Gregory Binda
(74) *Attorney, Agent, or Firm* — McGinn IP Law Group, PLLC

(57) ABSTRACT

A cross shaft member has four shaft portions arranged in a generally cross-shape around an outer periphery of a body portion thereof, and a recessed portion is formed in the body portion, and has a depth in a direction perpendicular to a plane in which axes of the four shaft portions lie. Four ridge-like thickened portions are formed in the recessed portion, and are equally spaced from one another, and extend diagonally with respect to the axes of the shaft portions in the plane.

18 Claims, 8 Drawing Sheets

CROSS SHAFT MEMBER AND CROSS SHAFT JOINT WITH THE SAME

BACKGROUND OF THE INVENTION

1. Field of the Invention

This invention relates to a cross shaft member. More specifically, the invention relates to a cross shaft member for forming a cross shaft joint (universal joint) used in a propeller shaft, an intermediate shaft of a vehicular steering apparatus or the like.

2. Related Art

In a vehicular steering apparatus, etc., a cross shaft joint has been used for interconnecting two shafts (not disposed on a common axis) in a torque-transmitting manner. This cross shaft joint comprises a cross shaft member having four shaft portions arranged in a generally cross-shape on an outer periphery of a body portion thereof, a plurality of rows of cylindrical rollers (rolling elements) provided respectively around the shaft portions, and bearing cups (outer rings) mounted respectively around the rows of cylindrical rollers, an outer peripheral surface of each shaft portion being used as an inner ring raceway surface for the cylindrical rollers (see, for example, JP-A-2005-351401).

Like other devices or members used in a vehicle, the above cross shaft joint has also been required to have a lightweight design and a compact design. Therefore, as shown in FIG. 7, a recessed portion 23 is formed in a central portion of a body portion 22 of a cross shaft member 21 forming a cross shaft joint. In this case, the body portion 22 has a brim surrounding the recessed portion 23, and those portions (brim portions) 22a of the brim each disposed between any two adjacent shaft portions 24 is thickened in order to enhance a static strength of the cross shaft member 21.

Although the lightweight design is achieved by forming the recessed portion in the central portion of the body portion, the static strength is inevitably reduced as compared with the case where such recessed portion is not formed, and particularly it has been desired to increase the static strength of the brim portions 22a on which a load concentrates depending on operating conditions, etc.

On the other hand, the static strength can be increased if the recessed portion is not formed in the body portion. In this case, however, the weight of the cross shaft member much increases, and this can not meet the above requirement of the lightweight design.

SUMMARY OF THE INVENTION

This invention has been made in view of the above circumstances, and an object of the invention is to provide a cross shaft member whose static strength can be greatly increased with a minimum weight increase and a cross shaft joint having such a cross shaft member.

According to the present invention, there is provided a cross shaft member characterized in that the cross shaft member has four shaft portions arranged in a generally cross-shape around an outer periphery of a body portion thereof, and a recessed portion is formed in the body portion, and has a depth in a direction perpendicular to a plane in which axes of the four shaft portions lie; and four ridge-like thickened portions are formed in the recessed portion, and are equally spaced from one another, and extend at an angle of about 45° relative to the axes of the shaft portions in the plane.

In the cross shaft member of the invention, the four ridge-like thickened portions are formed in the recessed portion formed in the body portion, and are equally spaced from one another, and extend at an angle of about 45° relative to the axes of the shaft portions. With this construction, the static strength of the cross shaft member can be greatly increased while keeping a weight increase to a minimum.

More specifically, the strength of the cross shaft member includes a fatigue strength and a static strength, and this fatigue strength is determined by stresses, and therefore can be adjusted by changing the shape of a neck of each shaft portion, etc. On the other hand, the static strength is less dependent on stresses, and is determined by a size (diameter) of the shaft portions and a volume of the body portion (i.e., a cross-sectional area of the body portion), and therefore in order to increase the static strength, it is necessary to increase the weight of the cross shaft member and particularly the weight of the body portion. In this connection, the inventor of the present invention has made an extensive study, and has found that what contributes to the increased static strength of the cross shaft member is not the overall volume of the body portion, but is the size of a cross-sectional area of the body portion through a plane disposed at an angle of about 45° relative to the axes of the shaft portions. Therefore, the four equally-spaced ridge-like thickened portions, extending at an angle of about 45° relative to the axes of the shaft portions, were formed in the recessed portion, and by doing so, the static strength of the cross shaft member could be greatly increased with a minimum weight increase. Particularly when a height of the ridge-like thickened portions is made generally equal to a height of brim portions (of a brim of the body portion surrounding the recessed portion) directly extending respectively to the ridge-like thickened portions, a static strength generally equal to that obtained when the recessed portion is not provided can be secured.

In the cross shaft member of the present invention, the static strength thereof can be greatly increased with a minimum weight increase, so that the static strength of the cross shaft joint is greatly increased.

DETAILED DESCRIPTION OF THE PREFERRED EMBODIMENTS

A preferred embodiment of a cross shaft member of the present invention will now be described in detail with reference to the accompanying drawings.

Figure 1:
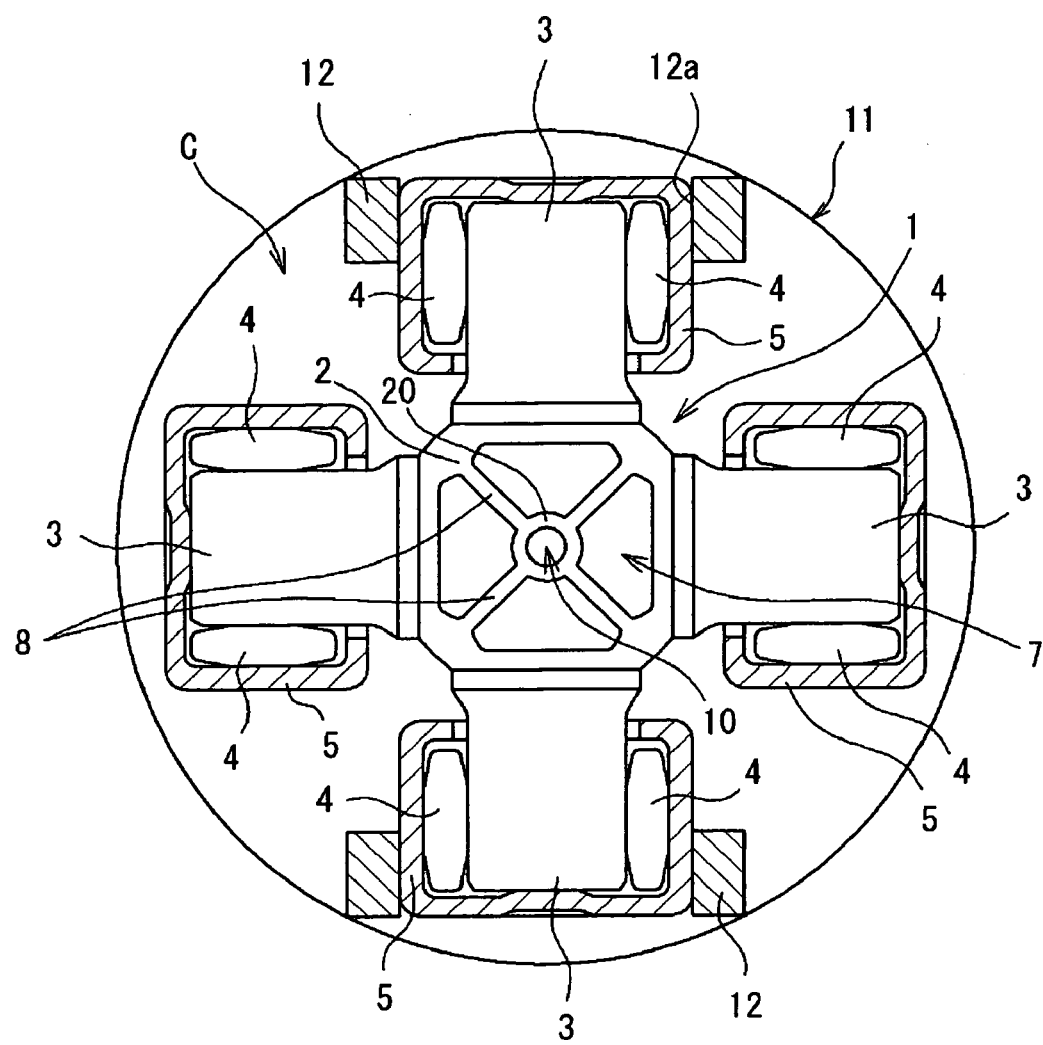
FIG. 1 is a partly cross-sectional, front-elevational view of a cross shaft joint including one preferred embodiment of a cross shaft member of the present invention.

FIG. 1 is a partly cross-sectional, front-elevational view of a cross shaft joint C provided with one preferred embodiment of the cross shaft member 1 of the invention. This cross shaft joint C comprises the cross shaft member 1 having four shaft portions 3 arranged in a generally cross-shape on an outer periphery of a body portion 2 thereof, a plurality of (circular) rows of cylindrical rollers (rolling elements) 4 provided respectively around the shaft portions 3, and bearing cups 5 rotatably mounted respectively on the shaft portions 3 through the respective rows of cylindrical rollers 4. In FIG. 1, only the bearing cups 5 and yokes 12 (described later) are shown in cross-section for the better understanding.

The cross shaft joint C is connected via yoke members 11 in a torque-transmitting manner to each end of a propeller shaft interposed between a transmission and a differential gear or to each end of an intermediate shaft interposed between a steering main shaft and a steering gear shaft of a vehicular steering apparatus. The yoke member 11 is of an integral or one-piece construction, and includes a tubular portion (not shown) fitted on the distal end of the propeller shaft or the intermediate shaft, and yokes 12 arranged in a bifurcated manner. Each yoke 12 has a bearing hole 12a through which the cross shaft joint C is mounted on the yoke member 11.

For the purpose of achieving a lightweight design, a recessed portion (or concave portion) 7 is formed in a central portion of the body portion 2 of the cross shaft member 1, and this recessed portion 7 has a depth in a direction perpendicular to a plane (imaginary plane) in which axes of the four shaft portions 3 (arranged in a generally cross-shape around the outer periphery of the body portion 2) lie, that is, has a depth in a direction perpendicular to the sheet of FIG. 1.

Figure 2A:
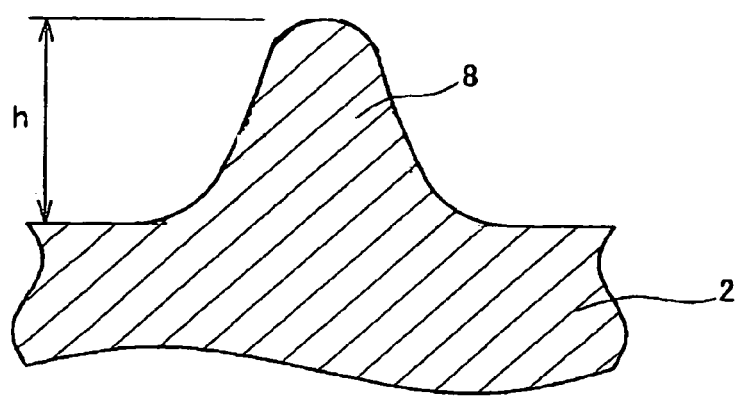
FIG. 2A is a cross-sectional view showing an exemplary embodiment of a cross-section of a ridge-like thickened portion shown in FIG. 1.
Figure 3:
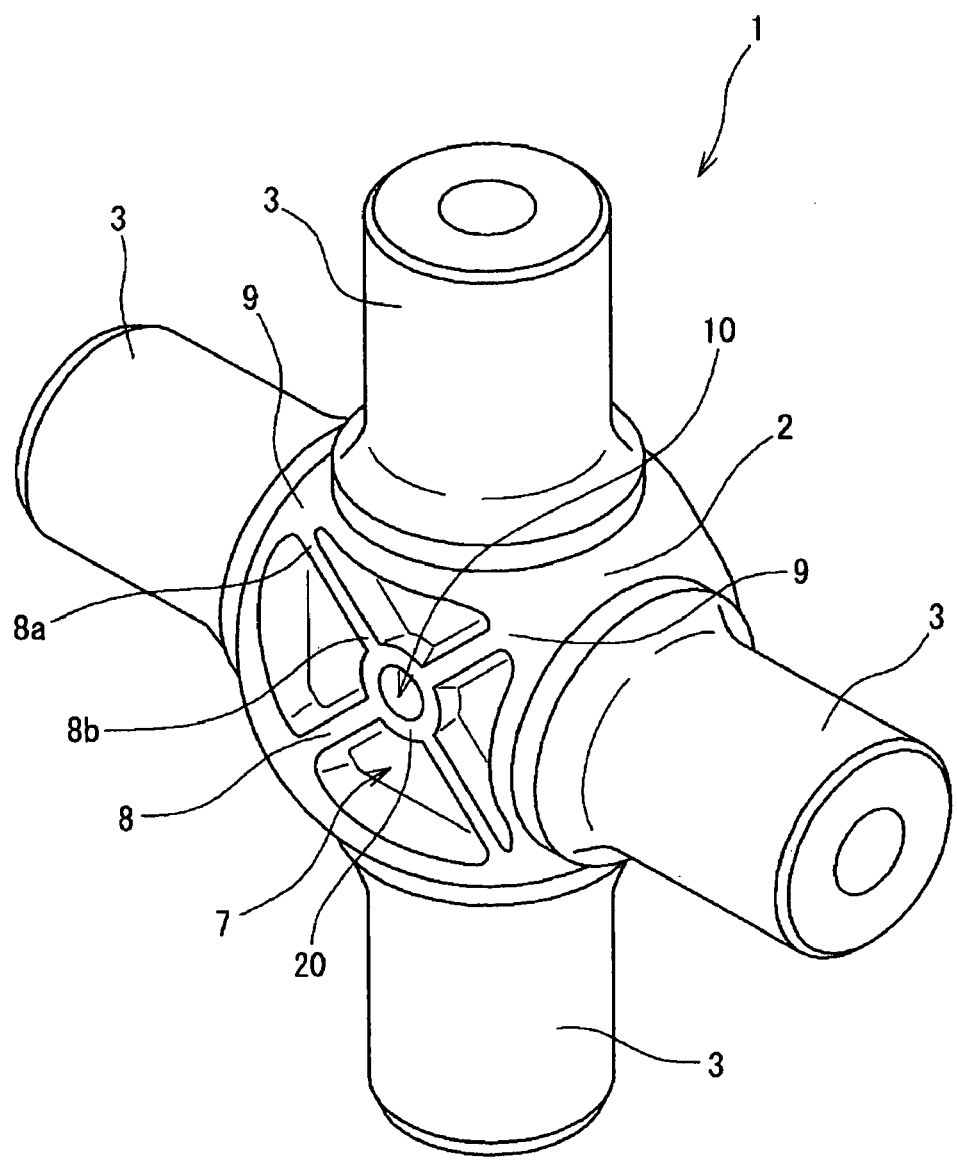
FIG. 3 is a perspective view of the cross shaft member of FIG. 1.

In this embodiment, four ridge-like thickened portions 8 are formed in the recessed portion 7, and are equally spaced from one another, and extend diagonally at an angle of generally 45° with respect to the axes of the shaft portions 3 in the above imaginary plane. This ridge-like thickened portion 8 has a mountain-shaped or a parabolic cross-section as shown in FIG. 2A. The body portion 2 has a brim surrounding the recessed portion 7, and a height h of the ridge-like thickened portion 8 is generally equal to a height of those portions (brim portions) 9 of the brim directly extending respectively to the ridge-like thickened portions 8. This height h is generally uniform over the entire length of the ridge-like thickened portion 8. Namely, the height h of the ridge-like thickened portion 8 is such that the height of that portion 8a thereof extending to the brim portion 9 is generally equal to the height of that portion 8b thereof disposed near to a central portion of the recessed portion 7. In FIGS. 1 and 3, reference numeral 10 denotes a grease supply hole for supplying grease to the bearings each comprising the row of cylindrical rollers 4 and the bearing cup 5. In order to provide this grease supply hole 10, a tubular portion 20 is formed on and projects perpendicularly from the central portion of the recessed portion 7. Each ridge-like thickened portion 8 is integrally connected at its outer end with the brim portion 9, and is also integrally connected at its inner end with an outer peripheral surface of the tubular portion 20.

As described above, the four equally-spaced ridge-like thickened portions 8 are formed in the recessed portion 7, and extend diagonally at an angle of generally 45° with respect to the axes of the shaft portions 3 in the above imaginary plane. With this construction, the static strength of the cross shaft member 1 can be greatly increased while suppressing the increase of the weight thereof, as described above. Particularly when the height h of the ridge-like thickened portions 8 is made generally equal to the height of the brim portions 9 (of the brim of the body portion 2 surrounding the recessed portion 7) directly extending respectively to the ridge-like thickened portions 8, a static strength generally equal to that obtained when the recessed portion 7 is not provided can be secured.

Figure 2B:
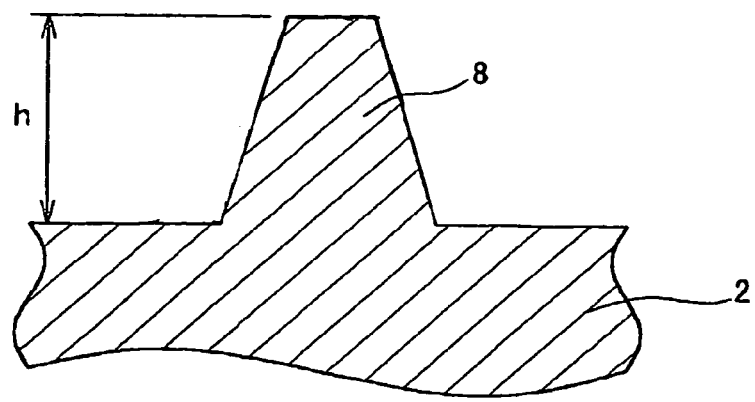
FIG. 2B is a cross-sectional view showing another exemplary embodiment of a cross-section of a ridge-like thickened portion shown in FIG. 1.

The cross-sectional shape of the ridge-like thickened portion 8 is not limited to the shape shown in FIG. 2A, but may be any other suitable shape such for example as a trapezoidal shape as illustrated in FIG. 2B in so far as the cross-sectional area through a plane disposed at an angle of 45° relative to the axes of the shaft portions 3 can be secured. The height h of the ridge-like thickened portion 8 may not be uniform over the entire length thereof, and also the portion thereof disposed near to the central portion of the recessed portion 7 may be higher or lower than the portion thereof disposed near to the brim portion.

Figure 4:
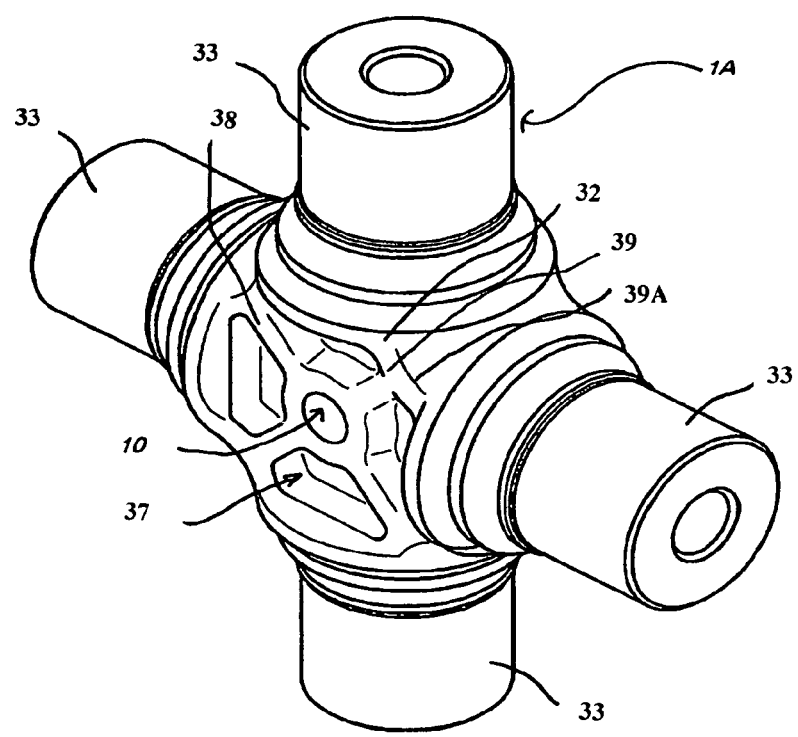
FIG. 4 is a perspective view of a cross shaft member according to Modification 1 of the invention.
Figure 5:
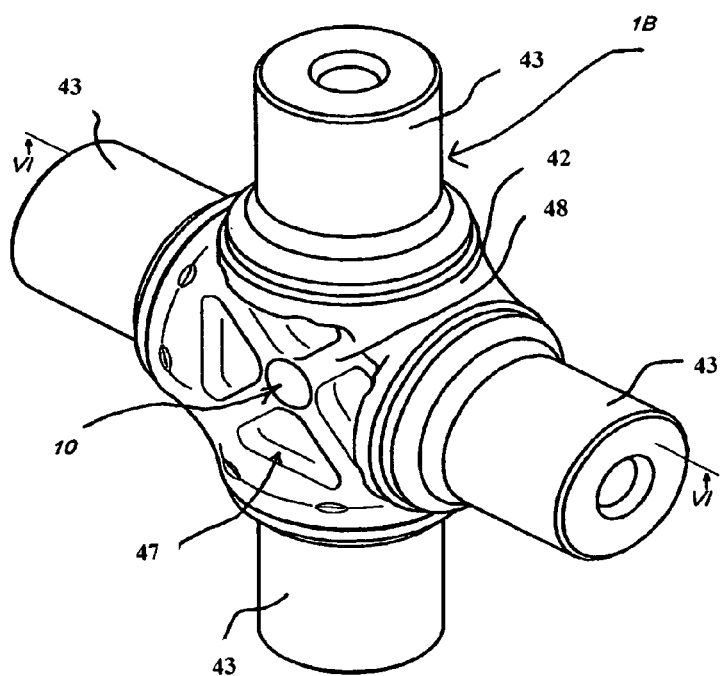
FIG. 5 is a perspective view of a cross shaft member according to Modification 2 of the invention.
Figure 6:
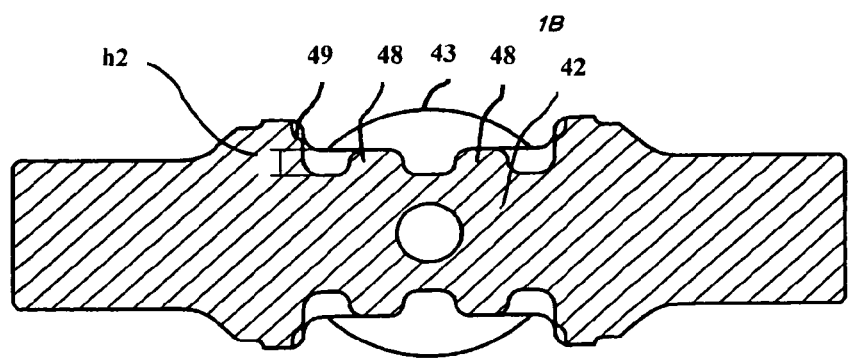
FIG. 6 is a cross sectional view showing a cross section of the cross shaft member according to Modification 2 taken along the line VI-VI in FIG. 5.
Figure 7:
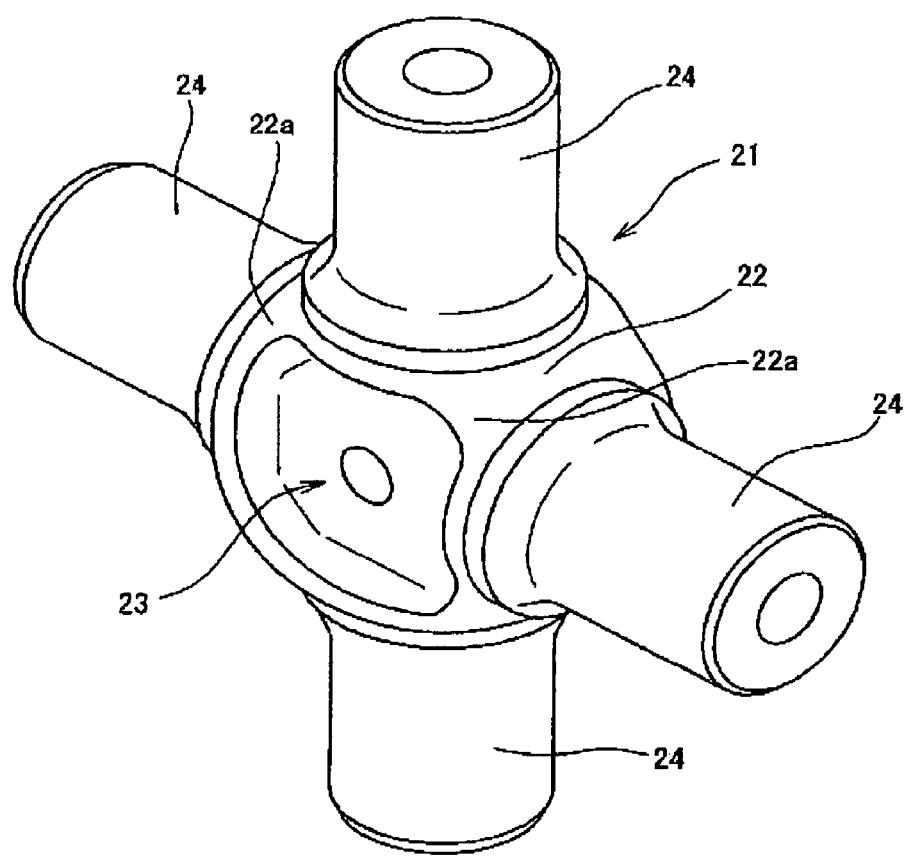
FIG. 7 is a perspective view of a conventional cross shaft member.

Modifications directed to the cross shaft member 1 according to the present invention will be described below with reference to FIGS. 4 to 6. FIG. 4 is a perspective view of a cross shaft member 1A according to Modification 1. FIG. 5 is a perspective view of a cross shaft member 1B according to Modification 2. FIG. 6 is a cross sectional view showing a cross section of the cross shaft member according to Modification 2 taken along the line VI-VI in FIG. 5.

Similarly to the cross shaft member 1 according to the above-described embodiment, the cross shaft 1A includes four shaft portions 33 arranged in a generally cross-shape on an outer periphery of a body portion 32 thereof. Four equally-spaced ridge-like thickened portions 38 are formed in a recessed portion 37, and extend diagonally at an angle of generally 45° with respect to the axes of the shaft portions 33 in an imaginary plane in which axes of the four shaft portions 33 lie. The height of the ridge-like thickened portion 38 in this modification is lower than the height of the brim portion 39. One end of each ridge-like thickened portion 8 is connected at a chamfered portion 39A in the brim portion 39.

Similarly to the cross shaft member 1 according to the above-described embodiment and the cross shaft member 1A according to Modification 1, the cross shaft 1B includes four shaft portions 43 arranged in a generally cross-shape on an outer periphery of a body portion 42 thereof. Four equally-spaced ridge-like thickened portions 48 are formed in a recessed portion 47, and extend diagonally at an angle of generally 45° with respect to the axes of the shaft portions 43 in an imaginary plane in which axes of the four shaft portions 43 lie. The height h2 of the ridge-like thickened portion 48 in this modification is lower than the height of the brim portion 49 as shown in FIG. 6.

Each of the cross shaft members 1A and 1B according to the above-described modifications constitutes a cross shaft joint C along with a plurality of (circular) rows of cylindrical rollers (rolling elements) provided respectively around the shaft portions 43, and bearing cups rotatably mounted respectively on the shaft portions 43 through the respective rows of cylindrical rollers.

What is claimed is:
1. A cross shaft member comprising:
four shaft portions arranged in a generally cross-shape around an outer periphery of a body portion thereof;
a recessed portion formed in said body portion and comprising a depth in a direction perpendicular to a plane in which axes of said four shaft portions lie,
wherein four ridge-like thickened portions are formed in said recessed portion, are equally spaced from one another, and extend diagonally with respect to the axes of said shaft portions in said plane, wherein a grease supply hole is formed on a tubular portion provided at a central portion of said recessed portion, and wherein said tubular portion is disposed so as to separate the grease supply hole from the recess portion.

2. A cross shaft member according to claim 1, wherein a height of a ridge-like thickened portion of the four ridge-like thickened portions is substantially equal to a height of a portion of a brim portion of the body portion that directly extends to the ridge-like thickened portion, so that a static strength is maintained substantially equal to a static strength obtained without forming the recessed portion.

3. A cross shaft joint comprising:
a cross shaft member comprising four shaft portions arranged in a generally cross-shape on an outer periphery of a body portion thereof;
a plurality of rolling elements provided around each of the shaft portions; and
bearing cups rotatably mounted respectively on the shaft portions through the rolling elements,
wherein the cross shaft member is a cross shaft member according to claim 1.

4. A cross shaft member according to claim 1, wherein the recessed portion is formed on an outer surface of the body portion.

5. A cross shaft member according to claim 1, wherein the ridge-like thickened portions are formed on an outer surface of the body portion.

6. A cross shaft member according to claim 1, wherein a height of a portion of the four ridge-like thickened portions is less than a height of a portion of a brim portion of the body portion that directly extends to the ridge-like thickened portion.

7. A cross shaft member according to claim 1, wherein the four ridge-like thickened portions connect to an outer periphery of the tubular portion.

8. A cross shaft member according to claim 1, wherein the tubular portion projects perpendicularly from the central portion of the recessed portion.

9. A cross shaft member according to claim 1, wherein the four ridge-like thickened portions are formed so as to extend diagonally at substantially an angle of 45 degrees with respect to axes of the four shaft portions, respectively.

10. A cross shaft member according to claim 1, wherein said grease supply hole is disposed such that an opening of the grease supply hole is disposed at least as axially outward, in an axial direction of the tubular portion, from a center of the cross shaft member as an axially outermost portion of the recessed portion.

11. A cross shaft member comprising:
four shaft portions arranged in a generally cross-shape around an outer periphery of a body portion thereof;
a recessed portion formed in said body portion and comprising a depth in a direction perpendicular to a plane in which axes of said four shaft portions lie;
wherein four ridge-like thickened portions are formed in said recessed portion and extend diagonally with respect to the axes of said shaft portions in said plane,
wherein a grease supply hole is formed on a crossing portion of said four ridge-like thickened portions, and
wherein said crossing portion is disposed so as to separate the grease supply hole from the recess portion.

12. A cross shaft member according to claim 11, wherein a height of a ridge-like thickened portion of the four ridge-like thickened portions is substantially equal to a height of a portion of a brim portion of the body portion that directly extends to the ridge-like thickened portion, so that a static strength is maintained substantially equal to a static strength obtained without forming the recessed portion.

13. A cross shaft joint comprising:
a cross shaft member comprising four shaft portions arranged in a generally cross-shape on an outer periphery of a body portion thereof;
a plurality of rolling elements provided around each of the shaft portions; and
bearing cups rotatably mounted respectively on the shaft portions through the rolling elements,
wherein the cross shaft member comprises a cross shaft member according to claim 11.

14. A cross shaft member according to claim 11, wherein the recessed portion is formed on an outer surface of the body portion.

15. A cross shaft member according to claim 11, wherein the ridge-like thickened portions are formed on an outer surface of the body portion.

16. A cross shaft member according to claim 11, wherein a height of a portion of the four ridge-like thickened portions is less than a height of a portion of a brim portion of the body portion that directly extends to the ridge-like thickened portion.

17. A cross shaft member according to claim 11, wherein the crossing portion projects perpendicularly from a central portion of the recessed portion.

18. A cross shaft member according to claim 11, wherein the four ridge-like thickened portions are formed so as to extend diagonally at substantially an angle of 45 degrees with respect to axes of the four shaft portions, respectively.

* * * * *